United States Patent
Cohen et al.

(10) Patent No.: US 11,093,512 B2
(45) Date of Patent: Aug. 17, 2021

(54) AUTOMATED SELECTION OF SEARCH RANKER

(71) Applicant: International Business Machines Corporation, Armonk, NY (US)

(72) Inventors: Doron Cohen, Gilon (IL); Shai Erera, Gilon (IL); Haggai Roitman, Yokneam Elit (IL); Bar Weiner, Kibbutz Yad Mordechai (IL)

(73) Assignee: International Business Machines Corporation, Armonk, NY (US)

(*) Notice: Subject to any disclaimer, the term of this patent is extended or adjusted under 35 U.S.C. 154(b) by 204 days.

(21) Appl. No.: 15/966,018

(22) Filed: Apr. 30, 2018

(65) Prior Publication Data

US 2019/0332682 A1    Oct. 31, 2019

(51) Int. Cl.
*G06F 16/2457* (2019.01)
*G06N 5/04* (2006.01)
*G06F 16/951* (2019.01)

(52) U.S. Cl.
CPC ...... *G06F 16/24578* (2019.01); *G06F 16/951* (2019.01); *G06N 5/04* (2013.01)

(58) Field of Classification Search
None
See application file for complete search history.

(56) References Cited

U.S. PATENT DOCUMENTS

| | | | |
|---|---|---|---|
| 7,505,964 B2* | 3/2009 | Tong | G06F 16/951 |
| 8,122,015 B2 | 2/2012 | Liu et al. | |
| 8,332,411 B2 | 12/2012 | Burges et al. | |
| 9,009,146 B1* | 4/2015 | Lopatenko | G06F 16/9535 707/723 |
| 9,361,406 B1* | 6/2016 | Taropa | G06F 16/3322 |
| 2009/0171942 A1* | 7/2009 | Suresh | G06F 16/35 |
| 2010/0121840 A1* | 5/2010 | Murdock | G06F 16/3346 707/722 |
| 2013/0031106 A1* | 1/2013 | Schechter | G06F 16/3326 707/749 |

(Continued)

OTHER PUBLICATIONS

Fiana Raiber et al., "Query-Performance Prediction: Setting the Expectations Straight", SIGIR '14 Proceedings of the 37th international ACM SIGIR conference on Research & development in information retrieval, Jul. 2014, pp. 13-22.

(Continued)

*Primary Examiner* — Kim T Nguyen
(74) *Attorney, Agent, or Firm* — Dvir Gassner (57) ABSTRACT

A method for automated selection of a search result ranker comprising: providing a set of queries; for each of said queries, receiving, from a search engine, a plurality of relevancy score sets, wherein each relevancy score set is associated with search results found in a corpus of electronic documents using each of a plurality of computerized search result rankers; calculating a difficulty score for each of said queries relative to all other queries in the set, based on said plurality of relevancy score sets associated with said query; calculating a quality score for each of said search result rankers based on said plurality of relevancy score sets associated with said search result ranker, wherein each of said plurality of relevancy score sets is weighed according to the difficulty score of its associated query; and selecting one of said search rankers based on said quality score.

20 Claims, 5 Drawing Sheets

(56) References Cited

U.S. PATENT DOCUMENTS

| 2014/0136284 A1* | 5/2014 | Reynolds | G06Q 10/06 |
| | | | 705/7.32 |
| 2015/0169589 A1* | 6/2015 | Lopiano | G06F 16/24578 |
| | | | 707/749 |
| 2017/0075893 A1 | 3/2017 | Hummel et al. | |
| 2017/0083568 A1 | 3/2017 | Rabinovich et al. | |

OTHER PUBLICATIONS

Haggai Roitman, "An Enhanced Approach to Query Performance Prediction Using Reference Lists", SIGIR '17 Proceedings of the 40th International ACM SIGIR Conference on Research and Development in Information Retrieval, Aug. 2017, pp. 869-872.

Gad Markovits et al., "Predicting Query Performance for Fusion-Based Retrieval", CIKM '12 Proceedings of the 21st ACM international conference on Information and knowledge management, 2012, pp. 813-822.

Haggai Roitman et al., "From "More Like This" to "Better Than This"", ICTIR '16 Proceedings of the 2016 ACM International Conference on the Theory of Information Retrieval, Sep. 2016, pp. 195-198.

Haggai Roitman et al., "Enhanced Mean Retrieval Score Estimation for Query Performance Prediction", ICTIR '17 Proceedings of the ACM SIGIR International Conference on Theory of Information Retrieval, 2017, pp. 35-42.

* cited by examiner

AUTOMATED SELECTION OF SEARCH RANKER

BACKGROUND

The invention relates to the field of computerized information retrieval (IR).

Many information retrieval tasks involve retrieving documents based on multiple search terms, each searched for in corpora containing many electronic documents.

The information retrieval task can be formulated as follows: given a document set, or corpus, and a search query, retrieve a ranked list of documents from the corpus which are most likely to be relevant to the search query.

Selecting the right retrieval strategy is a challenging task, which depends on the document corpora, search query sets, and end users. Many IR systems suffer from great variance in retrieval performance when responding to users' queries. Even for systems that succeed well on average, the quality of results returned for some of the queries is poor, which may lead to user dissatisfaction.

Therefore, the ability to estimate in advance the effectiveness of a search performed in response to a query is of great interest in the field of IR. Some approaches require post-retrieval relevance judgment, to train decision models for supervised ranker selection. However, in the absence of relevance judgments, query performance prediction (QPP) methods may be used for estimating search quality and thus utilized for retrieval strategy selection.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method for computerized automated selection of a search result ranker, the method comprising operating at least one hardware processor for providing a set of computerized search queries; for each of said search queries, receiving, from a computerized search engine, a plurality of relevancy score sets, wherein each relevancy score set is associated with search results found in a corpus of electronic documents using each of a plurality of computerized search result rankers; calculating a difficulty score for each of said search queries relative to all other search queries in said set of search queries, based on said plurality of relevancy score sets associated with said search query; calculating a quality score for each of said search result rankers based on said plurality of relevancy score sets associated with said search result ranker, wherein each of said plurality of relevancy score sets is weighed according to the difficulty score of its associated search query; and selecting one of said search rankers based on said quality score.

There is also provided, in accordance with an embodiment, a computer program product for automated selection of a search result ranker, the computer program product comprising a non-transitory computer-readable storage medium having program code embodied therewith, the program code executable by at least one hardware processor to provide a set of computerized search queries; for each of said search queries, receive, from a computerized search engine, a plurality of relevancy score sets, wherein each relevancy score set is associated with search results found in a corpus of electronic documents using each of a plurality of computerized search result rankers; calculate a difficulty score for each of said search queries relative to all other search queries in said set of search queries, based on said plurality of relevancy score sets associated with said search query; calculate a quality score for each of said search result rankers based on said plurality of relevancy score sets associated with said search result ranker, wherein each of said plurality of relevancy score sets is weighed according to the difficulty score of its associated search query; and select one of said search rankers based on said quality score.

There is further provided, in accordance with an embodiment, a system comprising at least one hardware processor, and a non-transitory computer-readable storage medium having stored thereon program instructions, the program instructions executable by the at least one hardware processor to provide a set of computerized search queries; for each of said search queries, receive, from a computerized search engine, a plurality of relevancy score sets, wherein each relevancy score set is associated with search results found in a corpus of electronic documents using each of a plurality of computerized search result rankers; calculate a difficulty score for each of said search queries relative to all other search queries in said set of search queries, based on said plurality of relevancy score sets associated with said search query; calculate a quality score for each of said search result rankers based on said plurality of relevancy score sets associated with said search result ranker, wherein each of said plurality of relevancy score sets is weighed according to the difficulty score of its associated search query; and select one of said search rankers based on said quality score.

In some embodiments, the difficulty score and the quality score are based on an estimation of a performance parameter using a query performance prediction (QPP) methodology.

In some embodiments, the QPP is based on a means retrieval score estimation methodology.

In some embodiments, the difficulty score is inversely correlated to said performance parameter.

In some embodiments, the weighting of the quality scores according to the difficulty scores of their associated search queries, is adjusted based on the distribution of said difficulty scores within said set of computerized search queries.

In some embodiments, the calculating of the quality scores comprises maximizing a utility function which determines a utility gain for each of said search result rankers. In some embodiments, the utility function further comprises at least one of a query-sensitive estimator and a corpus-sensitive estimator.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclosed herein are methods, systems, and computer program products for automated selection of computerized search result rankers, based on query performance prediction methods.

In the field of information retrieval (IR), the terms "ranker" or "ranking function" refer to an algorithm for sorting computerized search results in order of relevance, from the most to the least relevant. Ranking of search results is one of the fundamental tasks in IR. Given a query q entered by a user into a search engine, and a collection of documents D that match the query, the ranking problem is to sort the documents in D according to some criterion, so that the documents most responsive to an information need expressed in the query appear early in the result list displayed to the user. Search results ranking is often expressed as a numeric score for each query/document pair. Given a search query and a corpus of documents, different rankers will produce different relevance-based results, depending on the specific algorithm employed by each ranker. Therefore, search engines sometimes include more than one ranker, wherein each ranker is suited for different purposes. For example, some rankers, such as Okapi BM25 and its variants, may use a 'best matching' approach, wherein documents are ranked based on keyword frequency, regardless of proximity. Other rankers may incorporate phrase proximity, wherein keyword positions within document are taken into account. Yet other rankers may incorporate both of these and/or other approaches.

Figure 1:
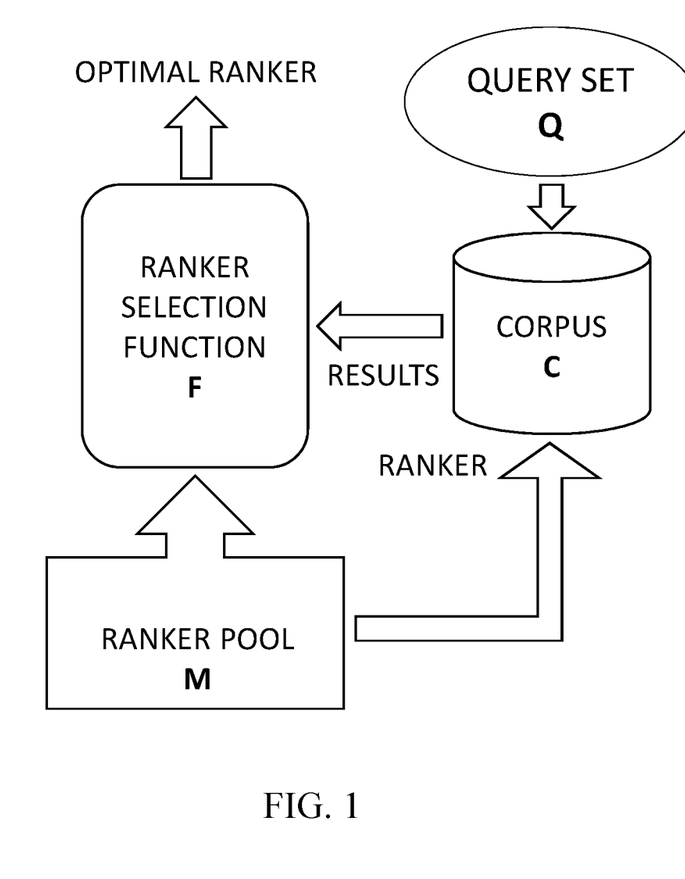
FIG. 1 is a schematic functional diagram of a ranker selection function, according to an embodiment.

Accordingly, in some embodiments, the present invention provides for automated selection of an optimal ranker from among a pool of provided rankers, to process search results in response to a query. In some embodiments, the optimal ranker is selected based on generating a prediction as to which ranker will generate the most relevant search results, given a set of search queries and a corpus of electronic documents. FIG. 1 is a schematic functional block diagram of a ranker selection function according to an exemplary embodiment. Given a document corpus C, a query set Q, and a ranker pool M, ranker selection function F evaluates the results of submitting queries from set Q over corpus C, using each ranker m from pool M, to automatically select an optimal ranker.

Figure 2:
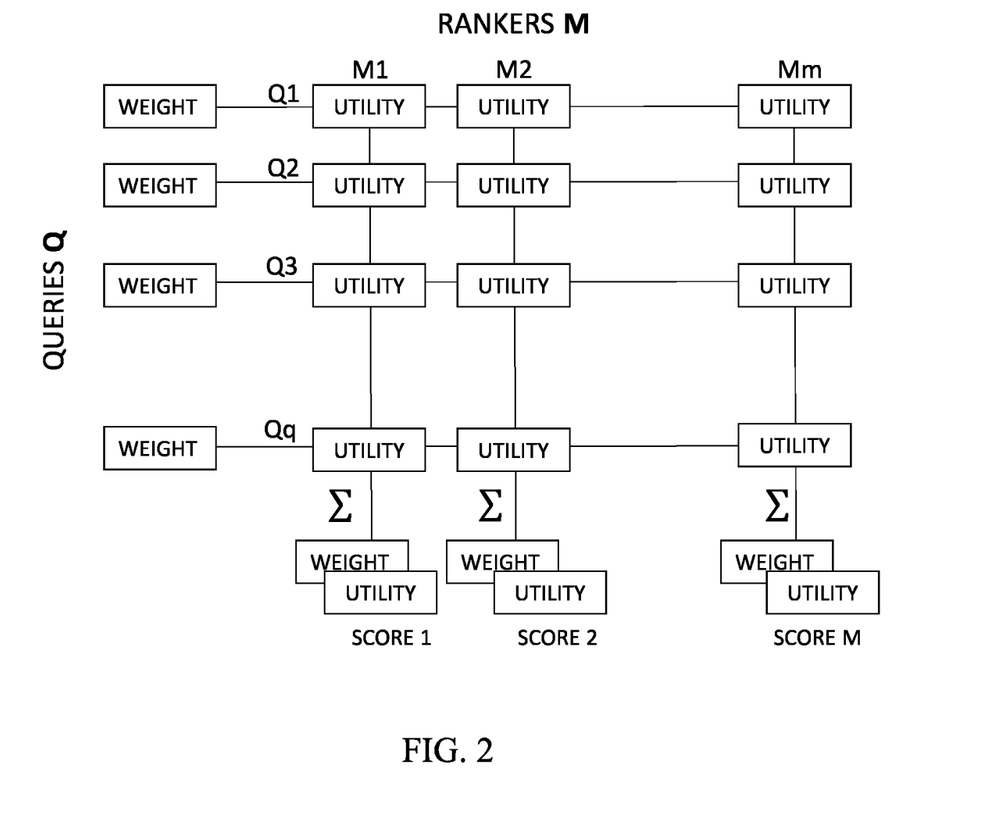
FIG. 2 is a schematic illustration of a utility function which may be employed by a system for automated selection of computerized search result rankers, according to an embodiment.

In some variations, ranker evaluation is performed using a utility maximization framework, which evaluates ranker performance with respect to set of queries Q over corpus C. As shown schematically in FIG. 2, a utility function may be employed to maximize the extraction of relevant information, as referenced by the 'utility' labels at the junction of each ranker/query combination. The utility function may assign a score to each ranker in pool M with respect to each query in a set Q over a corpus of documents, wherein the scores for each ranker are aggregated over the entire query set Q, and weighted in accordance with a difficulty parameter assigned to each query in set Q. The highest scoring ranker is then selected as the optimal ranker for the space Q/C.

In some embodiments, the present invention evaluates and selects rankers based on one or more query performance prediction methodologies. Query performance prediction (QPP) is a core prediction task in IR, wherein the performance assessment is performed in the absence of relevance judgment with respect to the results.

The ability to predict the performance of a search query in a search task can be utilized in the field of IR is several ways. One example is selective query expansion: given query q and its expanded version q', which one should be used to perform a given search? Another example is vertical selection: given a query q and several potential corpora to search $C_1, \ldots, Cn$, select the best vertical to serve the query. In the present context, QPP can serve to assist in ranker selection: given query q and one or more ranked result lists $D_1, \ldots, D_m$, each obtained by using some underlying ranker/retrieval strategy $M_i$, which ranker gives the best, most relevant results?

QPP can be performed on a pre-retrieval basis, by estimating the quality of the search results before the search takes place. Pre-retrieval methods can be split into linguistic and statistical methods. Linguistic methods apply natural language processing (NLP) techniques and use external linguistic resources to identify, e.g., ambiguity and polysemy in query phrasing. Statistical methods analyze the distribution of the query terms within the collection of documents.

Post-retrieval QPP methods aim to estimate the likelihood that a given retrieved result list D contains information responsive to an information need expressed by query q. A common post-retrieval QPP method is based on mean retrieval score estimation. As noted above, search results rankings are often expressed as numeric scores for each query/document pair, based on which the search results are ordered before presentation to a user. In the absence of results-based relevance judgements, analysis of retrieval scores can provide an estimation of query performance. Specifically, the mean retrieval score of the results can be used as a measure of search effectiveness. Mean score captures the central tendency of the distribution of retrieval scores. The higher this tendency is, the more the observed retrieval scores are assumed to represent actual effectiveness. An exemplary enhanced means retrieval score estimation QPP (EMRS-QPP) was proposed by the present inventors. See Roitman, Haggai et al; Enhanced Mean Retrieval Score Estimation for Query Performance Prediction; ICTIR '17, Oct. 1-4, 2017, Amsterdam, Netherlands. Under EMRS-QPP, if r denotes the relevance event, the goal is to estimate p(D|q,r), or the likelihood of finding relevant information for query q in result list D. To estimate p (D|q, r), the retrieval scores s(d) of the documents in D are analyzed. Specifically, the method focuses on the mean retrieval score, E(s|D), using a probabilistic framework to derive p(D|q,r).

Figure 3:
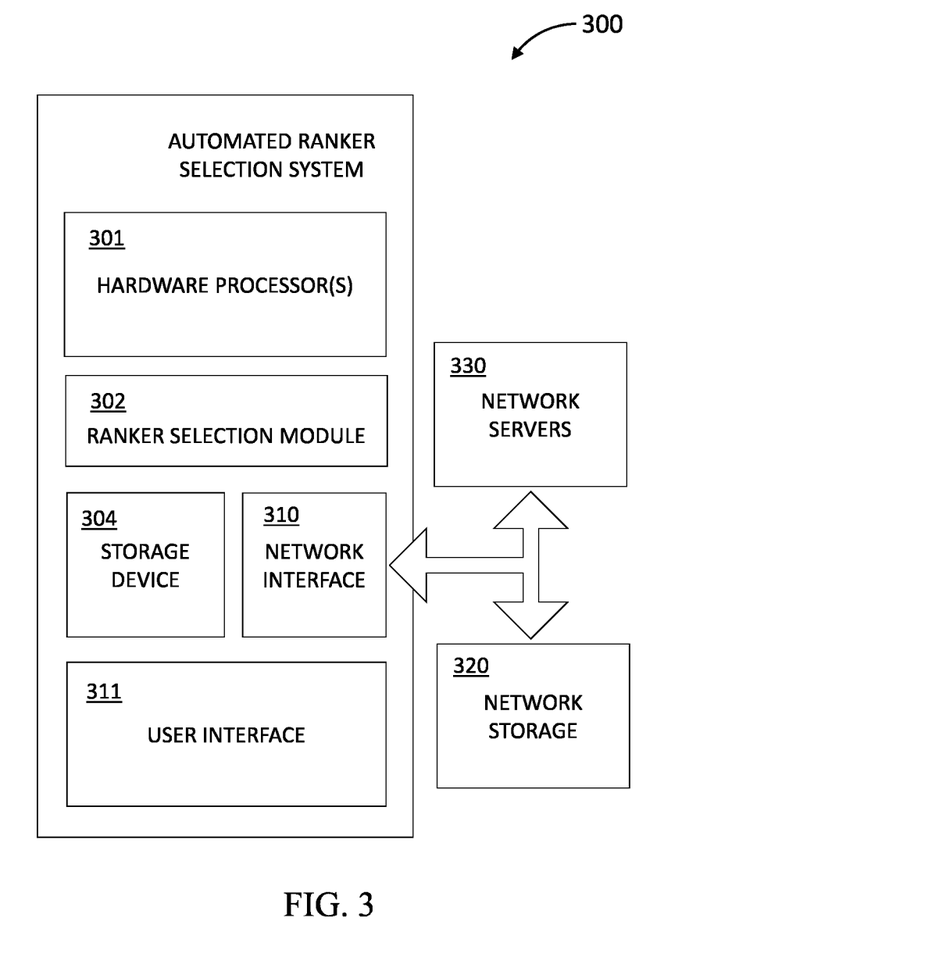
FIG. 3 is a schematic block diagram of a system for automated ranker selection, according to an embodiment.

Reference is made to FIG. 3, which is a schematic block diagram of an exemplary system 300 for automated ranker selection based on query performance prediction, in accordance with an embodiment. System 300 comprises one or more hardware processors 301, configured to execute processor instructions stored, e.g., on a non-transitory computer readable storage device 304. A ranker selection module 302 contains processor instructions that, when executed on hardware processor(s) 301, determine ranker selection. System 300 further may comprise a network interface 310, and a user interface 311. Network interface 310 is configured to allow access to a computer network, and thereby access to a network attached storage 320, and/or other servers 330, such as an information retrieval system, a computerized search engine, and the like.

Figure 4:
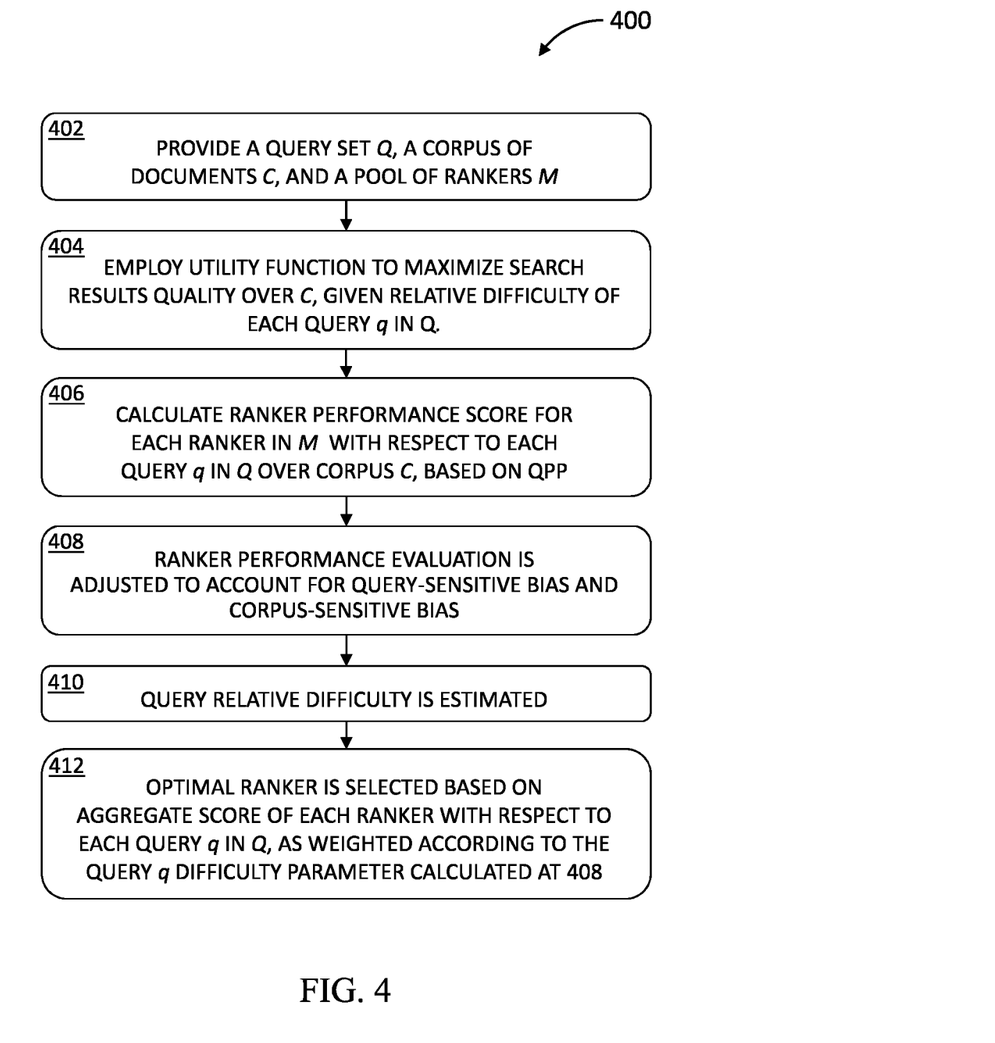
FIG. 4 is a flowchart of a method for automated selection of a ranker, in accordance with an embodiment.

Reference is made to FIG. 4, which is a flowchart of an exemplary method 400 for automated selection of a ranker based on query performance prediction, in accordance with an embodiment. At 402, there are provided a query set Q, a document corpus C, and a pool of search results rankers M.

At 404, a utility function is employed to select a ranker which will maximize ranking quality over C, given the relative difficulty of each query q in Q:

$$U(r|Q,C) \sum_{q \in Q} U(r|q,C)p(q|Q) =$$

$$\sum_{q \in Q} p(q|Q) \sum_{D \subseteq C} U(r|q,D,C)p(D|q,C).$$

The particulars of the utility function are as follows: given a set D of search results per query q from set Q:

$$\mathcal{D}_q = \{D_q^1, D_q^2, \ldots, D_q^m\},$$

wherein each search result in set D is retrieved by a different ranker m from set M, it is the aim of the utility function to maximize U(r|Q, C), which is defined as U (r|q, C), or the utility gained by serving a query q over corpus C using each ranker, wherein p(q|Q) denotes the relative 'importance' or difficulty of query q within Q. Accordingly, for each given query q in Q, it is assumed that M possible responses are drawn uniformly from C. The optimal ranker m selection under the constraint that only one ranker can be chosen for (Q,C), would then be:

$$l^* = \arg\max_{1 \leq l \leq m} \sum_{q \in Q} p(q|Q)U(r|q, D_q^l, C),$$

where $p(D_q^l|q,C)$ is assumed to be uniform on $D_q$. There is then assumed the following marginal utility function:

$$U(r|q,D,C) \stackrel{\text{def}}{=} p(r|q,D,C),$$

wherein the utility is defined as the likelihood that, given query q served over corpus C by response D, relevant information will be obtained.

At 406, the performance of each ranker is evaluated with respect to each query q in set Q over corpus C, based on one or more QPP methodologies, such as EMRS-QPP discussed above. The function for maximizing the utility of a ranker over the space Q/C may be defined as:

$$p(r|q,D,C) \propto p(r|q,D) \cdot p(r|D,C),$$

wherein $$p(r|q,D) = \sum_{d \in D} p(r|q,d)p(d|q,D),$$

or the likelihood that D retrieved for q contains relevant information; and $$p(r|D,C) = \sum_{d \in D} p(r|d,C)p(d|D),$$

or the likelihood that D retrieved from corpus C contains relevant information. Accordingly, the optimal selection policy should select the best ranker according to:

$$U_l(r|Q,C) \stackrel{\text{def}}{=}$$

$$\sum_{q \in Q} p(q|Q)[\sum_{d \in D_q^l} p(r|q,d)p(d|q,D_q^l)] \cdot [\sum_{d \in D_q^l} p(r|d,C)p(d|D_q^l)].$$

With continued reference to FIG. 4, at 408, in some embodiments, the utility function may be adjusted to account for two possible biases which may be present at a specific document corpus C: a query-sensitive bias and a corpus-sensitive bias. Accordingly, the present invention may incorporate a query-sensitive estimator, which accounts for query-related properties that may govern a document d's retrieval quality. The present invention may thus incorporate a corpus-sensitive estimator which accounts for corpus-related properties. The query-sensitive estimator can be derived as follows:

$$p(d|q,D_q^l) \stackrel{\text{def}}{=} \bar{s}_l(d|q) = \frac{s_l(d|q)}{\sum_{d' \in D_q^l} s_l(d'|q)} \text{ and}$$

$$p(r|q,d) \stackrel{\text{def}}{=} \sum_{w \in q} idf(w) \cdot \frac{tf(w|d) \cdot (k_1 + 1)}{tf(w|d) + k_1 \cdot \left(1 - b + b \cdot \frac{|d|}{avgdl}\right)},$$

based, e.g., on an Okapi-BM25 score, where $K_1$=1.2 and b=0.7. A corpus-sensitive variant can be derived as follows:

$$p(d|D_q^l) \stackrel{\text{def}}{=} \frac{1}{|D_q^l|}, \text{ and}$$

$$p(r|d,C) \stackrel{\text{def}}{=} \left(-\sum_{w \in d} p(w|d) \log \frac{p(w|d)}{nidf(w)}\right), \text{ where}$$

$$nidf(w) = \frac{idf(w)}{\sum_{w' \in d} idf(w')}.$$

With continued reference to FIG. 4, at 410, query relative difficulty p(q|Q) is estimated. In the simple case, all queries are equally important, i.e., $$p(q|Q) = \frac{1}{|Q|}.$$

However, queries usually have different difficulty levels, and accordingly, the utility function may be biased to award a higher score to a ranker that performs better on hard queries than on easy ones. Accordingly, p(q|Q) should be defined relative to the query difficulty of queries in Q, and reflect such difficulty distribution. For a given query q, a difficulty parameter p(r|q, $\mathcal{D}$) denotes post-retrieval query q performance based on ranker m response. It should be noted that the performance of the query can be estimated by any query-based QPP, such as the EMRS-QPP method discussed above. The relative difficulty of query q in Q can now be estimated using a consensus approach as follows:

$$p(r|q, \mathcal{D}_q) \stackrel{\text{def}}{=} \log \prod_{D_q^l \in \mathcal{D}_q} p(r|q, D_q^l),$$

Figure 5:
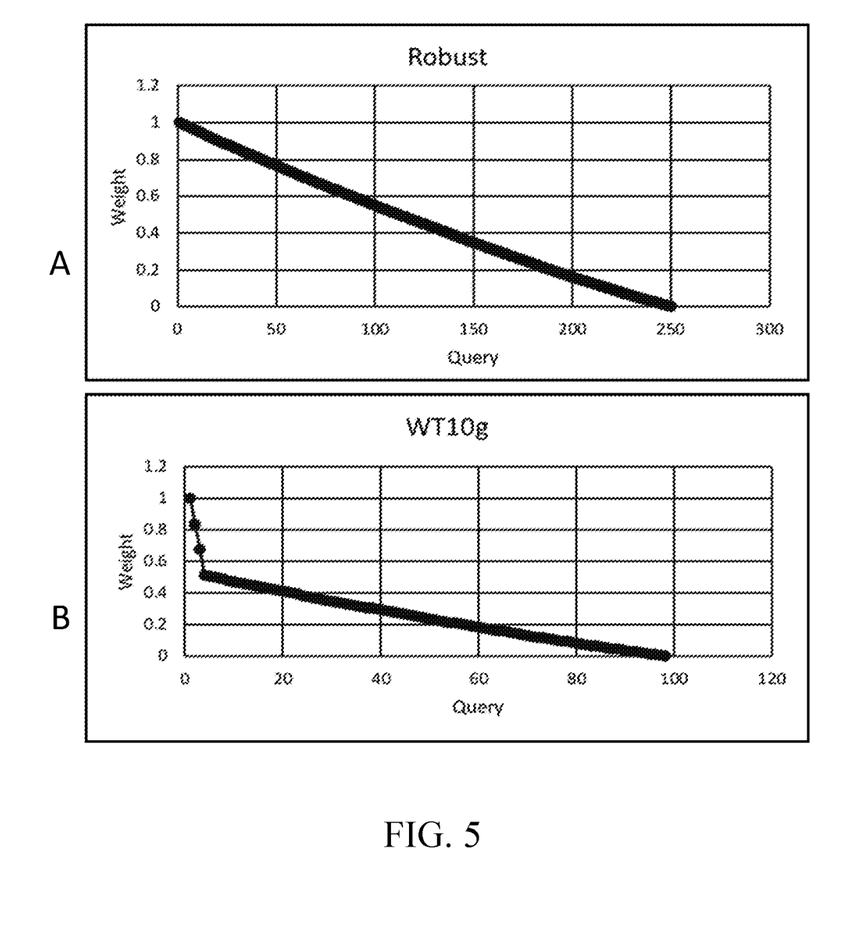
FIG. 5 depicts two charts showing exemplary query difficulty distribution.

It should be noted that each query q in Q should be weighted inversely to its performance. In other words, a query q predicted to perform worse should get a higher weight. In addition, as shown in FIG. 5, the query difficulty distribution in Q should be considered, wherein queries in a highly diverse set (panel A) should be differentiated more than queries in a less diverse set (panel B). The queries in Q are then sorted according to $p(r|q, \mathcal{D}_q)$, and an estimation of $$p(q_i|Q); 1 \le i \le |Q|,$$

is performed as follows:

$$p(q_i|Q)1 - \frac{\sum_{j<i} p(r|q_j, \mathcal{D}_q)}{\sum_{q \in Q} p(r|q, \mathcal{D}_q)}.$$

At 412, an optimal ranker is selected based on the aggregate score of each ranker with respect to query set Q, as weighted according to relative difficulty of each query q calculated at 410 above.

Evaluation Results

The following section reports the results of evaluations conducted with respect to the present automated ranker selection method. Various sets of queries were submitted over several corpora (listed in the top line of each chart), using a pool of rankers. The results were evaluated using metrics such as mean average precision (MAP), Kendall-Tau similarity (KT corr), rank biased overlap (RBO), utility, and lift. In one example, the following evaluation metric based on MAP may be used. Assuming that:

$$MAP_{lift}(i, j) = \frac{MAP(i)}{MAP(j)} - 1$$

denotes the relative lift in MAP when using a ranker i instead of ranker j in a pool of rankers M, and assuming that a ranker j* is the one with the highest MAP, then the selection utility of a ranker i is:

$$SU(i, j^*) = \frac{\sum_j MAP_{lift}(i, j)}{\sum_j MAP_{lift}(j^*, j)}.$$

Since $$SU(\bullet, j^*) \in [1-m, 1],$$

it can further be normalized by adding m−1 and dividing in m. The expected random selection utility is:

$$E[SU(\text{rand}, j^*)] = \frac{1}{m} \sum_i SU(i, j^*).$$

The lift in selection utility, given that ranker i is selected compared to the random selection, is thus:

$$SU_{lift}(i, \text{rand}) = \frac{SU(i, j^*)}{E(SU(\text{rand}, j^*))}.$$

The following tables 1-5 set forth results of evaluations conducted with respect to the present automated ranker selection method, using various sets of search results rankers.

For general information about best-matching (BM, such as OkapiBM25), language modelling (LM), term-frequency-times-inverse-document-frequency (TF-IDF), and divergence-from-randomness (DFR) retrieval rankers, see, for example, Roelleke, T., "Information Retrieval Models: Foundations and Relationships", Morgan & Claypool Publishers. For information about relevance model (RM) rankers, see Clinchant, S. et al., "A Theoretical Analysis of Pseudo-Relevance Feedback Models", International Conference on the Theory of Information Retrieval, 2013, Denmark. pp. 6, 2013.

For information-based (IB) models, see Clinchant, S. et al., "Information-based models for ad hoc IR", Proceeding of the 33rd international ACM SIGIR conference on Research and development in information retrieval (SIGIR '10), ACM, New York, N.Y., USA, 234-241. For data fusion models (such as combMNZ), see Shengli Wu, "Data Fusion in Information Retrieval", Springer Publishing Company, Incorporated, 2012, ISBN:3642288650 9783642288654.

Table 1 shows Lucene similarities results, using the following rankers: BM25(1.2,0.7), LM(Dir[1000]), LM(JM [0.9]), TF-IDF, and DFR, IB.

TABLE 1

|  | Robust | WT10g | AP | WSJ | SJMN | Aquaint | TREC123 | TREC5 | Average |
|---|---|---|---|---|---|---|---|---|---|
| KT corr. | 0.467 | 0.667 | 0.467 | 0.533 | 0.667 | 0.8 | 0.8 | 0.4 | 0.6 |
| RBO (0.6) | 0.385 | 0.433 | 0.812 | 0.884 | 0.375 | 0.553 | 0.833 | 0.786 | 0.633 |
| AP-Tau | 0.533 | 0.6 | 0.85 | 0.833 | 0.56 | 0.8 | 0.9 | 0.767 | 0.730 |
| Utility | 0.980559 | 0.990631 | 1 | 1 | 0.961454 | 0.990245 | 1 | 1 | 0.99 |
| Lift (rand) | 1.041 | 1.192 | 1.088 | 1.107 | 0.997 | 1.143 | 1.084 | 1.081 | 1.092 |
| #Queries | 250 | 100 | 100 | 50 | 50 | 50 | 50 | 50 | 87.5 |

Table 2 shows the query expansion results (with re-ranking), using the following rankers: BM25(1.2,0.7), LM(Dir[1000]), DFR, IB vs. RM1(LM[Dir]), RM3(LM[Dir]).

TABLE 2

|  | Robust | WT10g | AP | WSJ | SJMN | Aquaint | TREC123 | TREC5 | Average |
|---|---|---|---|---|---|---|---|---|---|
| KT corr. | 0.667 | 0.733 | 0.867 | 0.667 | 0.733 | 0.867 | 0.933 | 0.533 | 0.75 |
| RBO (0.6) | 0.473 | 0.484 | 0.532 | 0.943 | 0.505 | 0.505 | 0.932 | 0.212 | 0.573 |
| AP-Tau | 0.593 | 0.633 | 0.75 | 0.96 | 0.733333 | 0.733 | 0.95 | 0.453 | 0.726 |
| Utility | 0.994 | 0.999 | 0.992 | 1 | 0.981 | 0.991 | 1 | 0.940 | 0.987 |
| Lift (rand) | 1.067 | 1.078 | 1.042 | 1.092 | 1.052 | 1.108 | 1.078 | 0.979 | 1.062 |
| #Queries | 250 | 100 | 100 | 50 | 50 | 50 | 50 | 50 | 87.5 |

Table 3 shows query expansion results using the following rankers: LM(Dir[1000]) vs. RM1(LM[Dir]).

TABLE 3

|  | Robust | WT10g | AP | WSJ | SJMN | Aquaint | TREC123 | TREC5 | Average |
|---|---|---|---|---|---|---|---|---|---|
| KT corr. | 1 | 1 | 1 | 1 | 1 | 1 | 1 | 0 | 0.875 |
| RBO (0.6) | N/A | N/A | N/A | N/A | N/A | N/A | N/A | N/A | N/A |
| AP-Tau | 1 | 1 | 1 | 1 | 1 | 1 | 1 | 0 | 0.875 |
| Utility | 1 | 1 | 1 | 1 | 1 | 1 | 1 | 0.985 | 0.998 |
| Lift (rand) | 1.049 | 1.044 | 1.038 | 1.049 | 1.049 | 1.062 | 1.062 | 0.993 | 1.043 |
| #Queries | 250 | 100 | 100 | 50 | 50 | 50 | 50 | 50 | 87.5 |

Table 4 shows fusion results using the following rankers: BM25, DFR., IB, LM(Dir[1000]) vs. CombMNZ(LM, BM25).

TABLE 4

|  | Robust | WT10g | AP | WSJ | SJMN | Aquaint | TREC123 | TREC5 | Average |
|---|---|---|---|---|---|---|---|---|---|
| KT corr. | 0.6 | 0.8 | 0.6 | 0.4 | 0.7 | 0.6 | 0.6 | 0.3 | 0.575 |
| RBO (0.6) | 0.733 | 0.234 | 0.474 | 0.501 | 0.802 | 0.402 | 0.474 | 0.333 | 0.494 |
| AP-Tau | 0.646 | 0.25 | 0.667 | 0.688 | 0.875 | 0.625 | 0.667 | 0.542 | 0.620 |
| Utility | 1 | 0.986 | 0.981 | 0.988 | 1 | 0.992 | 0.974 | 0.986 | 0.988 |
| Lift (rand) | 1.027 | 1.017 | 1.032 | 1.027 | 1.031 | 1.031 | 1.024 | 1.019 | 1.026 |
| #Queries | 250 | 100 | 100 | 50 | 50 | 50 | 50 | 50 | 87.5 |

Table 5 shows ranker variance (noise) results, using the following rankers: BM25, LM[Dir], DFR, IB vs. 6 random re-rankers (base TF-IDF).

TABLE 5

|  | Robust | WT10g | AP | WSJ | SJMN | Aquaint | TREC123 | TREC5 | Average |
|---|---|---|---|---|---|---|---|---|---|
| KT corr. | 0.444 | 0.822 | 0.667 | 0.467 | 0.489 | 0.933 | 0.289 | 0.6 | 0.589 |
| RBO (0.6) | 0.157 | 0.455 | 0.784 | 0.645 | 0.0498 | 0.586 | 0.087 | 0.692 | 0.432 |
| AP-Tau | 0.384 | 0.733 | 0.790 | 0.529 | 0.346 | 0.857 | 0.508 | 0.522 | 0.584 |
| Utility | 0.981 | 0.991 | 1 | 1 | 0.785 | 0.99 | 0.775 | 1 | 0.940 |
| Lift (rand) | 1.210 | 1.542 | 1.178 | 1.258 | 0.915 | 1.336 | 0.920 | 1.271 | 1.204 |
| #Queries | 250 | 100 | 100 | 50 | 50 | 50 | 50 | 50 | 87.5 |

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for computerized automated selection of a search results ranker, the method comprising:
   operating at least one hardware processor for:
      providing a set of computerized search queries;
      for each of said search queries, receiving, from a computerized search engine, a plurality of relevancy score sets, wherein each of said relevancy score sets is associated with search results that were found in a corpus of electronic documents using each of a plurality of computerized search result rankers;

calculating a difficulty score for each of said search queries relative to all other search queries in said set of search queries, based on said plurality of relevancy score sets associated with said search query;

calculating a quality score for each of said search result rankers based on said plurality of relevancy score sets associated with said search result ranker, wherein each of said plurality of relevancy score sets is weighed according to the difficulty score of its associated search query; and selecting one of said search rankers based on said quality score.

2. The method of claim 1, wherein said difficulty score and said quality score are based on an estimation of a performance parameter using a query performance prediction (QPP) methodology.

3. The method of claim 2, wherein said QPP is based on a means retrieval score estimation methodology.

4. The method of claim 2, wherein said difficulty score is inversely correlated to said performance parameter.

5. The method of claim 1, wherein said weighting is adjusted based on the distribution of said difficulty scores within said set of computerized search queries.

6. The method of claim 1, wherein said calculating of said quality score comprises maximizing a utility function which determines a utility gain for each of said search result rankers.

7. The method of claim 6, wherein said utility function further comprises at least one of a query-sensitive estimator and a corpus-sensitive estimator.

8. A computer program product for automated selection of a search results ranker, the computer program product comprising a non-transitory computer-readable storage medium having program code embodied therewith, the program code executable by at least one hardware processor to:

provide a set of computerized search queries;

for each of said search queries, receive, from a computerized search engine, a plurality of relevancy score sets, wherein each of said relevancy score sets is associated with search results found in a corpus of electronic documents using each of a plurality of computerized search result rankers;

calculate a difficulty score for each of said search queries relative to all other search queries in said set of search queries, based on said plurality of relevancy score sets associated with said search query;

calculate a quality score for each of said search result rankers based on said plurality of relevancy score sets associated with said search result ranker, wherein each of said plurality of relevancy score sets is weighed according to the difficulty score of its associated search query; and select one of said search rankers based on said quality score.

9. The computer program product of claim 8, wherein said difficulty score and said quality score are based on an estimation of a performance parameter using a query performance prediction (QPP) methodology.

10. The computer program product of claim 9, wherein said QPP is based on a means retrieval score estimation methodology.

11. The computer program product of claim 9, wherein said difficulty score is inversely correlated to said performance parameter.

12. The computer program product of claim 8, wherein said weighting is adjusted based on the distribution of said difficulty scores within said set of computerized search queries.

13. The computer program product of claim 8, wherein said calculating of said quality score comprises maximizing a utility function which determines a utility gain for each of said search result rankers.

14. The computer program product of claim 13, wherein said utility function further comprises at least one of a query-sensitive estimator and a corpus-sensitive estimator.

15. A system comprising:

at least one hardware processor; and a non-transitory computer-readable storage medium having stored thereon program instructions, the program instructions executable by the at least one hardware processor to:

provide a set of computerized search queries;

for each of said search queries, receive, from a computerized search engine, a plurality of relevancy score sets, wherein each of said relevancy score sets is associated with search results found in a corpus of electronic documents using each of a plurality of computerized search result rankers;

calculate a difficulty score for each of said search queries relative to all other search queries in said set of search queries, based on said plurality of relevancy score sets associated with said search query;

calculate a quality score for each of said search result rankers based on said plurality of relevancy score sets associated with said search result ranker, wherein each of said plurality of relevancy score sets is weighed according to the difficulty score of its associated search query; and select one of said search rankers based on said quality score.

16. The system of claim 15, wherein said difficulty score and said quality score are based on an estimation of a performance parameter using a query performance prediction (QPP) methodology.

17. The system of claim 16, wherein said QPP is based on a means retrieval score estimation methodology.

18. The system of claim 16, wherein said difficulty score is inversely correlated to said performance parameter.

19. The system of claim 15, wherein said weighting is adjusted based on the distribution of said difficulty scores within said set of computerized search queries.

20. The system of claim 15, wherein said calculating of said quality score comprises maximizing a utility function which determines a utility gain for each of said search result rankers.

* * * * *